United States Patent
Tenne

[15] 3,691,918
[45] Sept. 19, 1972

[54] DEVICE IN A PHOTOGRAPHIC CAMERA FOR SETTING THE FILM SPEED VALUE AND TRANSFERRING IT TO THE EXPOSURE METER

[72] Inventor: Lave Tenne, Norbyvallda, Sweden

[73] Assignee: Fritz Victor Hasselblad, Goteborg, Sweden

[22] Filed: Aug. 2, 1971

[21] Appl. No.: 168,138

[30] Foreign Application Priority Data

Nov. 16, 1970   Sweden ................. 15466/70

[52] U.S. Cl. ............................................. 95/10 C
[51] Int. Cl. ............................................. G03b 7/00
[58] Field of Search ...................... 95/10 C, 31 CA

[56] References Cited

UNITED STATES PATENTS 3,400,646   9/1968   Kiper et al. ................... 95/10
3,457,844   7/1969   Kitai ............................ 95/10
3,604,327   9/1971   Hirata .......................... 95/10

Primary Examiner—Samuel S. Matthews
Assistant Examiner—Michael L. Gellner
Attorney—Sommers & Young

[57] ABSTRACT

A device for setting and transferring film speed value to an exposure meter in a camera, of the type employing a movable rod adapted to assume different axial positions corresponding to different film speed values, comprises a movable stop member located adjacent one end of the rod for defining the axial position of the rod. The position of the stop member is in turn controlled by a rotatable cam curve having a uniform pitch between its lowest and highest points, and a difference in height between said lowest and highest points sufficient to vary the position of the movable stop member through a total distance corresponding to the film speed range of the exposure meter.

8 Claims, 1 Drawing Figure

PATENTED SEP 19 1972 3,691,918
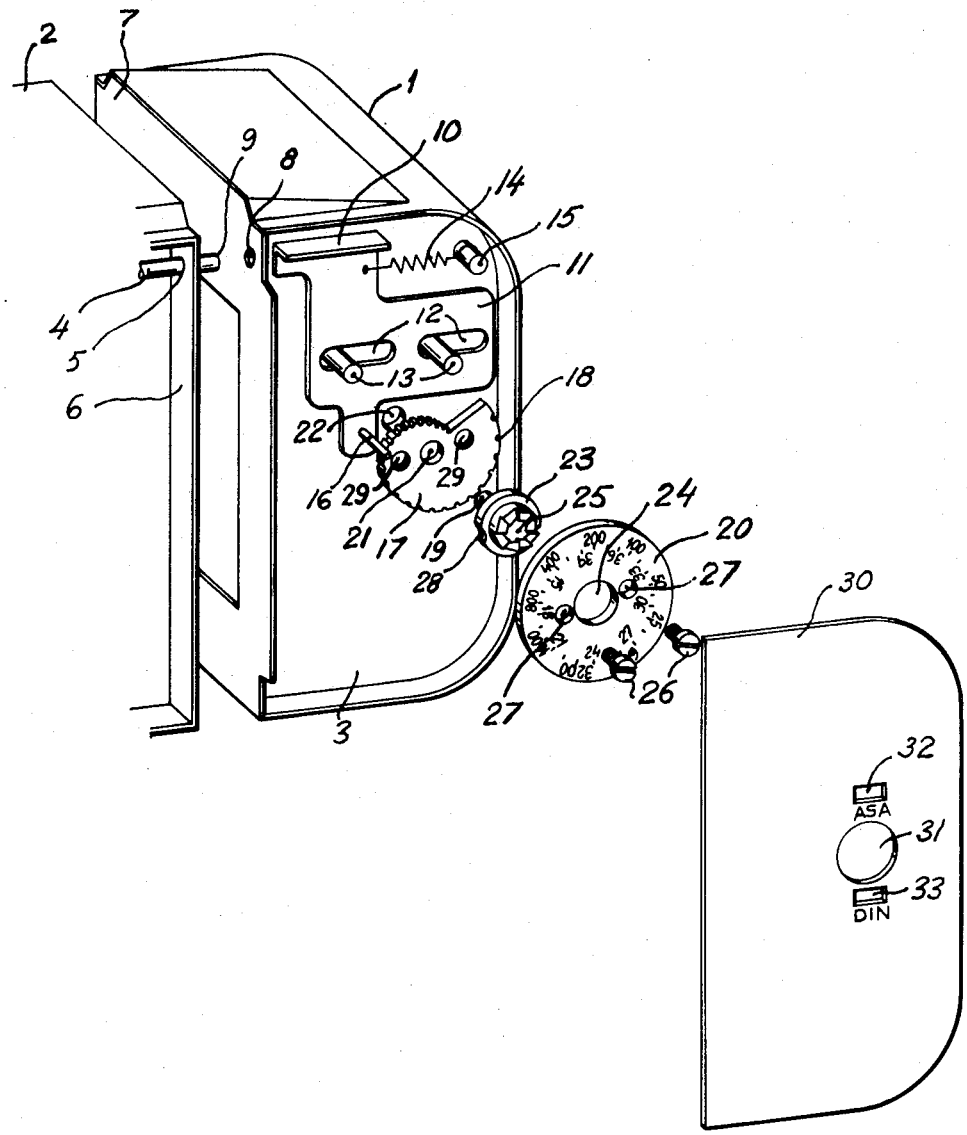

DEVICE IN A PHOTOGRAPHIC CAMERA FOR SETTING THE FILM SPEED VALUE AND TRANSFERRING IT TO THE EXPOSURE METER

BACKGROUND OF THE INVENTION

This invention relates to photographic cameras equipped with an exposure meter of the kind where a mechanical differential with inputs for the three exposure factors — aperture size, shutter speed, film speed value — upon activation of the exposure meter sets a variable resistance, the value of which is compared with that of a photoresistor comprised in the measuring circuit. The invention, more precisely, relates to a device for setting the film speed value and transferring this information to the film speed input at the mechanical differential, which input is an axially movable pressure rod sensing the position of an adjustable stop member corresponding to a set film speed.

Mechanical differentials of the aforesaid kind and included in exposure meters for photographic cameras are known previously of several different embodiments. As examples may be mentioned articulated and line differentials of various kinds designed to be adapted for the individual camera constructions. The information on the setting of the exposure factors is fed to the differential via inputs for aperture size, shutter speed and film speed. Among known types of inputs may be mentioned gear wheels and axially movable rods, in which the angle of rotation of the gear wheel and, respectively, the length of the rod motion corresponds to the value of the exposure factor set. The present invention relates to inputs of the axially movable rod type.

SUMMARY OF THE INVENTION

In accordance with the present invention, the stroke length of the axially movable rod constituting the differential input for film speed is limited by a stop member, which can be adjusted manually from the outside of the camera. Said stop member is movable in the direction of motion of the rod comprised in the input and rests by action of a spring against a cam curve, the angular position of which, in relation to a stationary index, corresponds to the set film speed. The cam curve has uniform pitch and such a difference in height between its lowest and highest point that the adjustable stop member is given a stroke length corresponding to the film speed range, for which the exposure meter has been constructed. For obtaining distinct setting positions for the different film speed values, the cam curve or its setting mechanism is provided with a resilient dentent structure which during normal handling of the camera, simultaneously prevents unintentional change of the set position. On the outside of the camera is provided an adjusting member for the cam curve in the form of a sunk grooved rotary plate, a crank or the like. The film speed setting is indicated by a rotary scale attached either to the adjusting member or separately to an axle common to the cam curve and the adjusting member, the set value being visible through a scale window in the film magazine or against an index mark.

The invention, when its individual details are given a suitable design, can be applied to a plurality of camera types equipped with an exposure meter of the aforesaid kind, but it is intended preferably for use in cameras of the type where the film is disposed in a separate film magazine exchangeably mounted on the camera box.

BRIEF DESCRIPTION OF THE DRAWINGS

A preferred embodiment of the invention will now be described in greater detail by reference to the accompanying drawing, which is a perspective and spread apart view of an exchangeable film magazine and adjacent parts of the associated camera box embodying the present invention.

DESCRIPTION OF THE PREFERRED EMBODIMENTS

An exchangeable film magazine 1 is attached by a fastening means (not shown) to a camera box 2. The device for setting a film speed value, and for transferring it to an exposure meter in the camera box 2, is located in the left-hand lateral end wall 3 of the film magazine 1. A mechanical differential for setting a variable resistance comprised in the exposure meter is provided with an input in the form of an axially movable rod 4 for sensing the film speed setting. Said rod 4 is mounted in a hole 5 in the lateral edge 6 of the camera box 2 and, by action of a spring (not shown), projects outwardly a short distance in the direction to the film magazine 1, thereby extending through a hole 8 in the wall 7 of the film magazine 1 facing the camera box 2. The rod 4 is obstructed in its axial movement toward the film magazine 1 when the free end 9 of the rod, upon activation of the exposure meter, contacts a stop portion 10 of an adjustable stop member 11 on the lateral end wall 3 of the film magazine 1. Said stop member 11, which is a planar plate with the bent stop portion 10, is movable in the direction of the rod 4 within a range corresponding to the film speed range of the differential. The stop member 11, upon moving, slides on two guide pins 13 which are mounted in the lateral end wall 3 and extend through two longitudinal slots 12 in the stop member 11. A helical spring 14, which is fastened at one end to the stop member 11 and at its other end to a pin 15 mounted on the lateral end wall 3, tends to draw the stop member 11 as far as possible in the direction away from the rod 4. This movement is limited by a sensing pin 16, which is mounted on the stop member 11 and which by action of the spring 14, presses against an adjustable cam curve 17.

Cam curve 17 ascends uniformly from its lowest to its highest point, the difference in height between these points thereby providing a stroke length of the adjustable stop member 11 which corresponds to the film speed range, for which the exposure meter has been constructed. For rendering possible distinct setting positions for the different film speed values, the cam curve 17 is provided on its circumference with a series of shallow grooves 18, which are not self-locking and correspond to the setting positions for the film speed values in question. When setting a film speed value, the cam curve 17 is turned as described below, whereby the sensing pin 16 by action of the spring 14 resiliently follows the profile of the cam curve 17 (and of the grooves 18) to that groove 18 which corresponds to the speed of the film inserted in the film magazine 1. The device forms a snap lock providing both an accurate setting position on the cam curve 17 and preventing an unintentional change of the position of the cam curve 17.

The cam curve 17 is assembled in a single unit with an axle 19 and an index disc 20, on which the film speed values are marked. The axle 19 extends through a central bore 21 in the cam curve 17 and is rotatably mounted in a hole 22 in the lateral end wall 3 of the film magazine 1. A flange 23 on the axle 19 supports the index disc 20, which with its central bore 24 encloses the end surface of the axle 19, which is formed as a grooved crank 25. The cam curve 17, axle 19 and index disc 20 are assembled by screws 26 or rivets extending through mounting holes 27 in the index disc 20, past grooves 28 in the flange 23, into and mounting holes 29 in the cam curve 17. The mechanism described is covered by an end wall plate 30 including a hole 31 for rendering accessible the grooved crank 25 to a user's fingertip and two index windows 32, 33 are also provided for the reading of ASA and, respectively, DIN film speed values, which as mentioned above are marked on the index disc 20.

The embodiment of the invention described and shown is only one example of how the basic idea of the invention can be applied. The design of the individual details may be varied considerably within the scope of the basic idea so as to be adapted for the details of the respective camera model coacting with the invention and for the space available in the camera. As one example of such a variation may be mentioned that the adjustable stop member 11 can be replaced by a spring-loaded arm rotatably mounted at one of its ends with one side of said arm being actuated by a cam curve in accordance with the invention and the other side of said arm acting as a stop member for stopping the rod 4.

I claim:

1. A device for setting film speed value and for transferring said value to an exposure meter in a camera, of the type wherein a movable rod is adapted to assume different axial positions corresponding respectively to different film speed values which are to be transferred to the exposure meter, comprising a movable stop member located adjacent said rod for defining the axial position of said rod, a rotatable cam curve located adjacent said stop member, means for selectively changing the rotational position of said cam curve, resilient means resiliently urging said movable stop member toward said cam curve whereby the rotational position of said cam curve determines the position of said adjustable stop member thereby to define the axial position of said rod, said cam curve having a uniform pitch between its lowest and highest points, the difference in height between the lowest and highest points of said cam curve being preselected to permit the position of said movable stop member to be varied through a total distance corresponding to the film speed range of the exposure meter in said camera.

2. The structure of claim 1 wherein said means for changing the rotational position of said cam curve is manually accessible from the exterior of said camera.

3. The structure of claim 1 wherein said cam curve includes a series of grooves spaced from one another along the edge of said curve between said highest and lowest points, said stop member including a pin adapted to engage any selected one of said grooves to inhibit unintentional changes in the setting position of said device.

4. The structure of claim 1 wherein said device is mounted on a film magazine adapted to be removably attached to a camera.

5. The structure of claim 1 wherein said stop member comprises a planar plate mounted for slidable movement in a direction parallel to the axial direction of said rod, said plate including a first portion positioned to engage one end of said rod for limiting the axial position of said rod and a second portion positioned to engage said cam curve for defining the slidable position of said plate, said resilient means comprising spring means urging said second portion into engagement with said cam curve.

6. The structure of claim 5 wherein both said first and second portions extend in directions transverse to the plane of said plate.

7. The structure of claim 1 including an index disc attached to said cam curve for rotation therewith.

8. The structure of claim 7 wherein said means for changing the rotational position of said cam curve comprises a manually accessible member extending through an aperture in said index disc.

* * * * *